United States Patent
Alava

[11] Patent Number: 5,611,572
[45] Date of Patent: Mar. 18, 1997

[54] SPLASH GUARD FOR A TRACKED VEHICLE

[76] Inventor: Hannu Alava, FIN-99870 Inari, Finland

[21] Appl. No.: 307,694

[22] PCT Filed: Mar. 22, 1993

[86] PCT No.: PCT/FI93/00108
§ 371 Date: Oct. 24, 1994
§ 102(e) Date: Oct. 24, 1994

[87] PCT Pub. No.: WO93/18957
PCT Pub. Date: Sep. 30, 1993

[30] Foreign Application Priority Data

Mar. 23, 1992 [FI] Finland ................. 921 241

[51] Int. Cl.$^6$ .......................................... B62D 55/08
[52] U.S. Cl. ............................ 280/847; 180/184
[58] Field of Search ........................ 280/847, 848, 280/849, 851, 855, 152.05, 152.1, 152.3, 156, 157, 12.1; 180/184, 182, 185, 186, 190, 191, 193; 293/11

[56] References Cited

U.S. PATENT DOCUMENTS

| | | | |
|---|---|---|---|
| 1,314,225 | 8/1919 | Souchek | 280/157 |
| 1,759,793 | 5/1930 | Lund | 280/847 |
| 2,197,183 | 8/1936 | Keeler | 280/855 |
| 2,982,584 | 5/1961 | Uemura | 305/12 |
| 4,146,101 | 3/1979 | Plourde | 180/190 |
| 4,174,653 | 11/1979 | Appelblatt | 280/851 |
| 4,613,006 | 9/1986 | Moss et al. | 180/190 |

FOREIGN PATENT DOCUMENTS

| | | | |
|---|---|---|---|
| 0391282 | 10/1990 | European Pat. Off. | |
| 891054 | 9/1953 | Germany | 280/849 |

OTHER PUBLICATIONS

Derwent's abstract, No. 78-J5071A/43, week 7843, Abstract of SU, 583020 (Polshakov) 17 Dec. 1977.

Primary Examiner—Richard M. Camby
Assistant Examiner—Frank Vanaman
Attorney, Agent, or Firm—Pollock, Vande Sande & Priddy

[57] ABSTRACT

A splash guard for a tracked vehicle, the tracked vehicle comprising a track unit which comprises a frame, a track wheel, and a track, the splash guard being placed in an immediate vicinity of the track and attached to the track unit by means of a support, the splash guard comprising on a side facing the track, two slide rails extending in a direction parallel to a direction of movement of the track, and the track being fitted to slide against the slide rails as the splash guard touches the track due to up and down motions of the track unit during travel.

5 Claims, 2 Drawing Sheets 5,611,572

SPLASH GUARD FOR A TRACKED VEHICLE

FIELD OF THE INVENTION

The present invention relates to a splash guard for a tracked vehicle. The tracked vehicle including a track unit, which includes a frame, a track wheel, possible auxiliary wheels and a track. The splash guard is placed in the immediate vicinity of the track and is attached to the track unit by means of a support. In particular, this invention relates to a splash guard for a motor sled.

BACKGROUND ART

The splash guard of a motor sled is normally a splash flap made of rubber which is attached to the frame of the motor sled so that it hangs freely from its upper edge somewhat behind the track unit. The splash guard is generally attached to the rear of the frame by screws having relatively large washers.

The splash guard suffers from poor durability and poor performance. A splash guard that is attached at its upper part tends to turn even at low speeds, due to air flow and snow and slush hitting the flap, to a position such that the snow and the slush flying from the rotating track can fly nearly unhindered underneath the flap.

When the motor sled is run on a terrain or when the flexible play between the track and the frame of the motor sled otherwise decreases during the travel, a freely swinging splash guard may touch the forward moving upper part of the track so that the upper part of the track pulls the splash flap partly on top of the track. In this position, the splash flap does not prevent the rotating track from flinging snow and slush far away behind the motor sled. Sometimes the splash flap, which has been pulled on top of the roll, does not return to the original position but the motor sled has to be stopped and the splash flap has to be drawn by hand away from the top of the track. This drawback may of course be improved by shortening the splash flap, but this results in an even poorer splash guarding.

The patent publication EP 0391 282 describes a light terrain vehicle in which the splash guard is attached to the track unit so that it moves with the up and down motions of the track unit. The distance between the splash guard and the track is constant and sufficiently small to prevent the snow and slush flinging from the rotating track from flying behind the vehicle. The drawback with this splash guard is, however, that the rotating track quickly wears out the splash guard as it hits the wall of the splash guard. Furthermore, the splash guard has a shape that cannot completely prevent the snow from being thrown behind the vehicle.

SUMMARY OF THE PRESENT INVENTION

The object of the present invention is to obtain a decisive improvement and substantially eliminate the above drawbacks. This object is achieved by the structure of a splash guard according to the present invention. The splash guard includes, on the side facing the track, preferably two slide rails extending in the longitudinal direction of the track. That is, the splash guard and the track are fitted to slide against the slide rails as the splash guard touches the track due to the up and down motions of the track unit during travel. The splash guard according to the invention is attached to the track unit of the motor sled at two points on the opposite sides relative to the longitudinal axis of, for example, the rearmost track wheel, so that the front part of the splash guard starts at least from the front of the rearmost track wheel and extends in the immediate vicinity of the track curving behind the track nearly to the level of the lower surface of the track.

The invention will be described in details in the following with reference to the accompanying drawings, in which

DETAILED DESCRIPTION OF THE PREFERRED EMBODIMENTS

Figure 1:
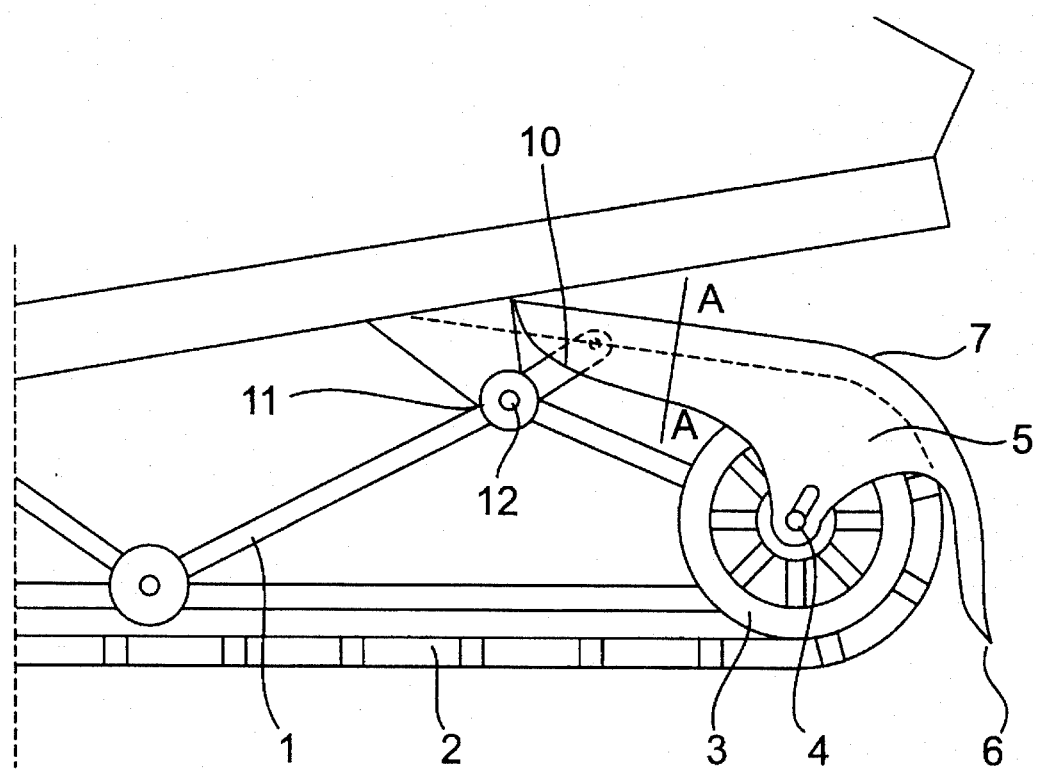
FIG. 1 represents schematically the track unit of a tracked vehicle seen from the side and FIG. 2 represents a cross-section of the splash guard according to this invention.

FIG. 1 shows schematically the track unit 1, 2, 3 of a motor sled having a relatively rigid splash guard 7 attached thereto by means of a support 5, 5a. In the shown embodiment the splash guard is rigidly attached to the shaft 4 of the rearmost track wheel 3 by means of support wings 5, 5a. FIG. 1 shows only one support wing 5, the other support wing being located at the corresponding place on the other side of the unit. Here the support wings 5, 5a form a uniform and fixed structure with the splash guard 7. The support wings 5, 5a may also be separate supports made of metal, which are connected with bolts or the like to the splash guard. In the this embodiment, the splash guard starts at least from the front of the track wheel 3 and is situated, according to FIG. 1, in the immediate vicinity of the track and curves at the rear track wheel 3 behind the track 2 almost to the level of the lower surface of the track. The splash guard 7 has at its lower part a bend 6 which is preferably directed outwards.

Figure 2:
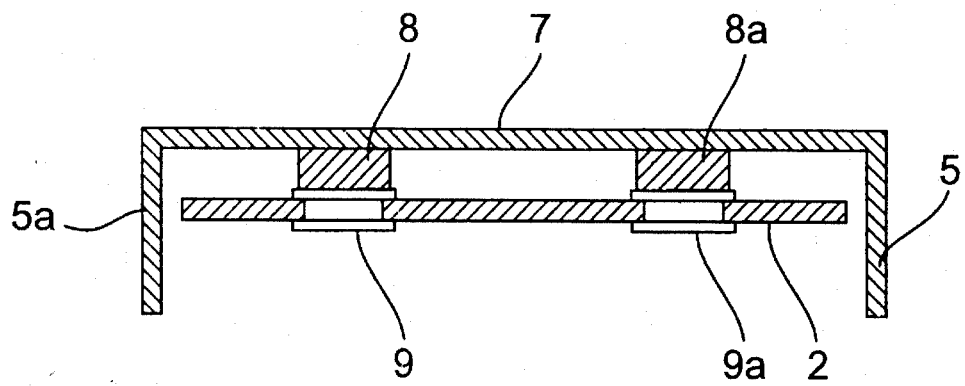
Figure 4:
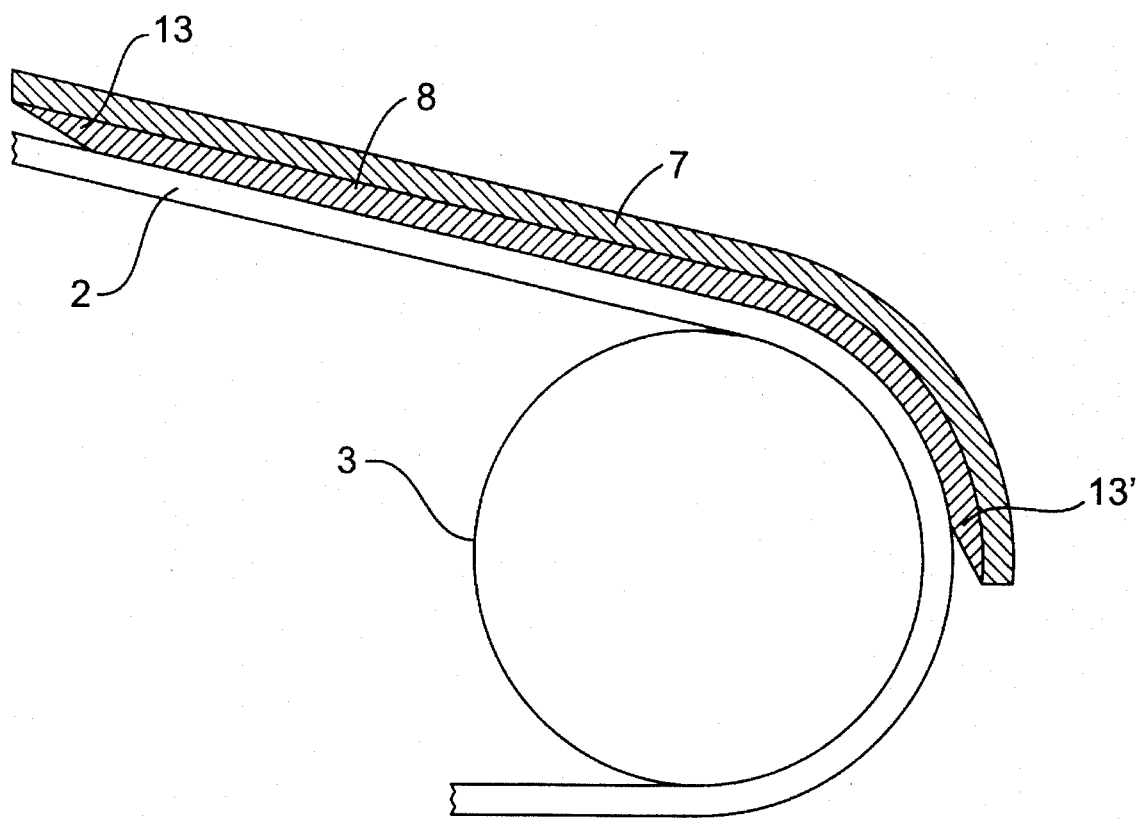
FIG. 4 is a cross-sectional view of another embodiment of the splash guard and the rearmost track wheel.

According to FIG. 2, the splash guard 7 is provided with reinforcing plastic slide rails 8, 8a, which are positioned in such a way that they are located opposite to the drive links of the track 2. The drive links are reinforced with steel tips 9, 9a. The slide rails 8, 8a are of the same width as the steel tips 9, 9a and of the same length as the splash guard. The slide rails 8, 8a taper in thickness at both ends (13, 13') smoothly into the thickness of the body of the splash guard 7, as shown in FIG. 4. When the splash guard according to the present invention tilts relative to the shaft 4, the plastic slide rails 8, 8a touch the steel tips 9, 9a on the track 2 and slide against them so that all wear is directed to the slide rails 8, 8a, and not to the body of the splash guard, which significantly prolongs the life of the splash guard and decreases frictional properties. The slide rails 8, 8a are detachably attached so that they can be readily replaced.

The splash guard 7 of the invention shows the best performance when it is manufactured totally of a flexible and strong plastic. Other manufacturing materials may also be used provided that the slide rails 8, 8a have good sliding properties and low noise level.

In the preferred embodiment the splash guard 7 is rigidly fixed by the support wings 5, 5a to the shaft 4 of the track wheel 3. Another alternative is to fix the support wings 5, 5a with bearings to the shaft 4 and add second fasteners 10, 10a to the front part of the splash guard. FIG. 1 shows only one fastener 10. The second fastener is located at the corresponding point on the other side of the splash guard (not shown). The fasteners 10, may also be parts which are similar to the support wings 5, 5a forming an integral part of the apparatus. The fasteners 10, 10a added to the front part of the splash guard are mounted on bearings or, for example with articulation to the shaft 12 of the auxiliary wheel 11 of the track unit 1, 2, 3.

Figure 3:
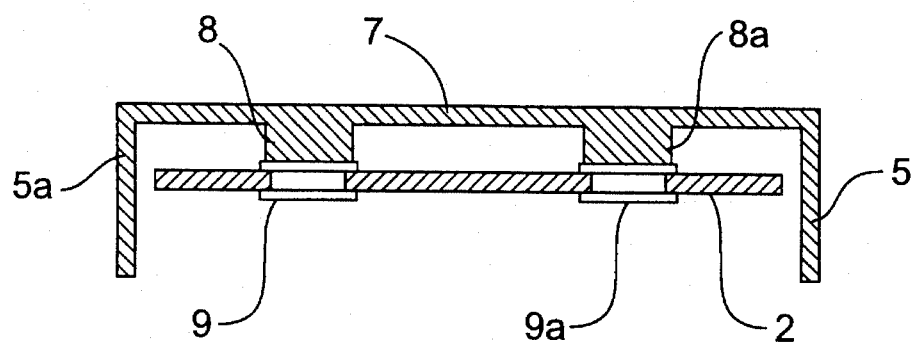
FIG. 3 represents a cross-section of the splash guard showing another embodiment of the invention.

The invention is not limited to the above embodiment but it can varied within the scope of the accompanying claims. For example, the slide rails can also be of a single piece with the splash guard. The splash guard, as shown, for example, in FIG. 3 according to the invention is suitable for splash guarding not only in motor sleds but also in other light tracked vehicles.

I claim:

1. A splash guard for a tracked vehicle, the tracked vehicle comprising a track unit which comprises a frame, a track wheel, and a track, the splash guard being placed in an immediate vicinity of the track and attached to the track unit by means of a support, the splash guard comprising on a side facing the track, two slide rails extending in a direction parallel to a direction of movement of the track, and the track being fitted to slide against the slide rails as the splash guard touches the track due to up and down motions of the track unit during travel.

2. A splash guard according to claim 1 wherein the slide rail is detachably attached to the splash guard.

3. A splash guard according to claim 1 wherein the slide rail and the splash guard are made as a single piece.

4. A splash guard according to claim 1 wherein the slide rail is as long as the splash guard and tapers in thickness at both ends.

5. A splash guard according to claim 1 wherein a front part of the splash guard starts at least from a front of a rearmost track wheel, and a lower part of the splash guard curves behind the track and extends nearly to a level of a lower surface of the track and that the lower part of the splash guard is provided with a bend which is directed outwardly away from the track.

* * * * *